(12) United States Patent
Trunner et al.

(10) Patent No.: US 12,636,600 B2
(45) Date of Patent: May 26, 2026

(54) FILTER ELEMENT, FILTER DEVICE, ARRANGEMENT AND ASSEMBLY METHOD

(71) Applicant: ARGO-HYTOS GROUP AG, Baar (CH)

(72) Inventors: Daniel Trunner, Kraichtal (DE); Thomas Weiser, Sinsheim (DE); Roman Weidemann, Östringen (DE); Roberto Stiegele, Sinsheim (DE)

(73) Assignee: ARGO-HYTOS GROUP AG, Baar (CH)

( * ) Notice: Subject to any disclaimer, the term of this patent is extended or adjusted under 35 U.S.C. 154(b) by 456 days.

(21) Appl. No.: 18/044,512

(22) PCT Filed: Sep. 2, 2021

(86) PCT No.: PCT/EP2021/074239
§ 371 (c)(1),
(2) Date: Mar. 8, 2023

(87) PCT Pub. No.: WO2022/053384
PCT Pub. Date: Mar. 17, 2022

(65) Prior Publication Data
US 2023/0321566 A1     Oct. 12, 2023

(30) Foreign Application Priority Data

Sep. 10, 2020    (DE) ..................... 10 2020 123 586.0

(51) Int. Cl.
*B01D 35/30*        (2006.01)

(52) U.S. Cl.
CPC ........ *B01D 35/30* (2013.01); *B01D 2201/291* (2013.01); *B01D 2201/305* (2013.01)

(58) Field of Classification Search
CPC .............. B01D 35/30; B01D 2201/291; B01D 2201/305; B01D 2201/24;
(Continued)

(56) References Cited

U.S. PATENT DOCUMENTS 5,670,042 A      9/1997 Clausen et al.
2007/0080106 A1* 4/2007 Gilles .................... B01D 29/96
184/6.24
(Continued)

FOREIGN PATENT DOCUMENTS

CN        105992626        10/2016
CN        107519685        12/2017
(Continued)

OTHER PUBLICATIONS

First Office Action issued in correspoding Chinese Patent Application No. 202110201134.X, Sep. 16, 2022, 8 pages.
(Continued)

*Primary Examiner* — Madeline Gonzalez
(74) *Attorney, Agent, or Firm* — HSML P.C.

(57)        ABSTRACT

The present invention relates to a filter element for the filtration of fluids, in particular hydraulic oil, having at least one end plate and a filter material which has a hollow-cylindrical shape and is connected to the end plate at an end face, wherein the end plate is designed to transmit a torque to a housing part, in particular a filter cover and/or a filter pot, of a filter device, wherein the end plate has at least one form-fitting element for receiving a torque and at least one
(Continued)

transmission region for transmitting the torque to the housing part. The invention also relates to a filter device, an arrangement and an assembly method.

8 Claims, 9 Drawing Sheets

(58) Field of Classification Search
CPC .. B01D 2201/295; B01D 29/96; B01D 29/21; B01D 29/213; B01D 35/306; F15B 21/041
USPC .... 210/232, 455, 450, 493.2, 440–444, 454, 210/282
See application file for complete search history.

(56) References Cited

U.S. PATENT DOCUMENTS

2009/0057219 A1    3/2009  Bagci et al.
2012/0223006 A1    9/2012  Sann et al.
2013/0037478 A1    2/2013  Thomas et al.
2014/0021119 A1*   1/2014  Malgorn ............. B01D 29/908
                                                210/232
2017/0361252 A1   12/2017  Vogt et al.
2019/0046904 A1*   2/2019  Norén ................... B01D 29/21

FOREIGN PATENT DOCUMENTS

DE        694 14 261 T2    3/1999
DE     10 2009 050 587     4/2011
DE     10 2010 015 677    10/2011
JP          10-328508     12/1998
JP         2009-119390     6/2009

OTHER PUBLICATIONS

First German Examination Report issued in corresponding German Patent Application No. 10 2020 123 586.0, Mar. 15, 2021, 6 pages.
International Search Report issued in International Application No. PCT/EP2021/074239, Dec. 21, 2021, 5 pages w/translation.
Written Opinion issued in International Application No. PCT/EP2021/074239, Dec. 21, 2021, 6 pages.

* cited by examiner

FILTER ELEMENT, FILTER DEVICE, ARRANGEMENT AND ASSEMBLY METHOD

The invention relates to a filter element, a filter device, an arrangement and an assembly method. A filter element according to the preamble of claim 1 is known, for example, from WO 2008/086328 A1.

Generally, filter devices with filter elements are used for the filtration of liquid or gaseous media. Such filter devices can be line filters, suction filters, return flow filters or return suction filters, which are used in mobile and stationary hydraulics. The filter elements are conventionally adapted to the respective application to ensure optimum filter function of the filter devices.

If a filter element needs to be replaced due to damage or because it has reached its maximum service life, it is usually replaced with a new, functional filter element. To prevent the installation of an unsuitable filter element or the operation of the filter device without a filter element, so-called "spin-on filters" are often used, wherein a filter cartridge consisting of filter pot and filter element is replaced as a unit. Such a filter device is known, for example, from the document WO 2008/086328 A1 mentioned at the beginning.

This filter device has the disadvantage that in the case of a replacement of the filter element, the filter pot as part of the filter housing must also be replaced and disposed of. Reuse of the filter pot is not possible here.

The invention is based on the object to provide a filter element that increases operational reliability, reduces operating costs and simplifies maintenance. Furthermore, the invention is based on the object to provide a filter device, an arrangement and an assembly method.

According to the invention, this object is achieved by the subject matter of the claims. Furthermore, the aforementioned object is achieved in each case by the subject matter that includes the filter device, the arrangement and the assembly method.

Specifically, the object is achieved by a filter element for the filtration of fluids, in particular hydraulic oil, having at least one end plate and a filter material which has a hollow-cylindrical shape and is connected to the end plate at an end face. The end plate is designed to transmit a torque to a housing part, in particular a filter cover and/or a filter pot, of a filter device. The end plate has at least one form-fitting element for receiving a torque and at least one transmission region for transmitting the torque to the housing part.

The filter element has a longitudinal axis. The end plate forms an axial closure of the hollow-cylindrical shape of the filter material. According to the invention, the end plate is arranged on the end face of the hollow-cylindrical filter material. Preferably, the filter element has at least two end plates, wherein the two end plates are in each case arranged on an end face of the filter material opposite one another.

According to the invention, the end plate is connected to the end face of the filter material. The connection of the end plate to the filter material can be of firmly bonding and/or form-fitting design. The end face of the filter material can be firmly connected to the end plate by adhesive bonding.

The invention has the advantage that the end plate has a dual function. Namely, the end plate not only forms the axial closure of the filter material. The end plate is also designed to transmit a torque to a housing part of a filter device in order to secure the housing part to a filter head of the filter device.

In the installed state of the filter element in a filter device, in particular a pressure filter and/or a return filter, the filter element is coupled to a housing part of the filter device in such a manner that a torque can be transmitted from the end plate of the filter element to the housing part. In other words, in the installed state, the end plate of the filter element is connected to the housing part in a torque-transmitting manner. During torque transmission, the end plate preferably interacts with a mating contour of the housing part so that the housing part is rotated with the filter element.

For example, torque transmission takes place during initial assembly of the filter element with the filter device or, for example, during maintenance of the filter device during which the filter element must be replaced.

The end plate has a form-fitting element and a transmission region. The form fitting element is used to receive a torque. The torque is preferably introduced into the form-fitting element by a tool. In other words, the form-fitting element is designed such that the torque can be introduced into the form-fitting element. The form fitting element preferably has a shape that enables a form fit with a tool.

The transmission region of the end plate is used to transmit the torque received by the form-fitting element to the housing part of the filter device. For this purpose, the form-fitting element and the transmission region of the end plate are connected to each other in a torque-transmitting manner. The form-fitting element and the transmission region can be connected to each other in a directly or indirectly torque-transmitting manner.

During the replacement of the filter element, the transmission region transmits the torque introduced via the form-fitting element to the housing part of the filter device. In the course of this, the filter element is rotated about its longitudinal axis, wherein the rotational movement is transmitted to the housing part by the transmission region.

In the context of the invention, the filter element forms a separate component of the filter device that is detachable from the housing part and is provided in a replaceable manner. During maintenance, the filter element according to the invention can be easily and quickly removed from or inserted into the filter device.

Replacing the filter element is carried out without disposing of the housing part. The housing part can be reused. The filter element thus reduces the components of the filter device that need to be replaced during maintenance, thereby reducing operating costs.

Preferably, the housing part is a filter cover or filter pot of the filter device that is attached or can be attached to a filter head of the filter device.

Preferred embodiments of the invention are specified in the subclaims.

In a preferred embodiment, the form-fitting element is designed such that the filter element can be set in rotational movement about its longitudinal axis. In other words, the form-fitting element is fixedly formed on the end plate so that when a torque is applied to the form-fitting element, the filter element is rotated about the longitudinal axis. The form-fitting element can have a body axis that lies on the longitudinal axis of the filter element. Specifically, the form-fitting element can have an axis of rotation that coincides with the longitudinal axis of the filter element. The filter element can thus be set in rotation about its longitudinal axis by the form-fitting element so that a torque can be transmitted to the housing part of the filter device.

In a further preferred embodiment, the form-fitting element forms an extension of the end plate. The extension is preferably formed to protrude at an end of the end plate facing away from the end face. In other words, the extension protrudes outwards from the end plate in the axial direction. The extension preferably extends from the end plate in the axial direction away from the end face of the filter material. The extension is preferably elongated in shape. The extension can be cylindrical or cuboidal in shape. The extension can be formed centrally on the end plate, in particular lying on the longitudinal axis of the filter element. The extension enables easy actuation or rotation of the filter element. The extension serves to receive a torque for rotational actuation of the filter element and thus for loosening and tightening the housing part of the filter device during maintenance.

Preferably, the form-fitting element has a first form-fitting contour. The first form-fitting contour can be formed as an external hexagon. The first form-fitting contour can be formed radially on the outside of the form-fitting element. Additionally, the first form-fitting contour can be connectable to a tool for introducing a torque. In other words, the extension preferably has the first form-fitting contour. The first form-fitting contour is formed radially on the outside of the extension. The first form-fitting contour is designed in such a manner that a torque can be introduced into the form-fitting element and thus the end plate by means of a form fit, for example with a tool.

More preferably, the form-fitting element has a second form-fitting contour. The second form-fitting contour can be formed as an internal square. The second form-fitting contour can be formed radially on the inside on the form-fitting element. In other words, the second form-fitting contour can form an inner contour of a recess formed in the form-fitting element. The recess can be formed in the extension. The second form-fitting contour can be connectable to a tool for introducing a torque. The second form-fitting contour is formed in such a manner that a torque can be introduced into the form-fitting element and thus the end plate by means of a form fit, for example with a tool, in particular an Allen key.

A torque of the form-fitting element and thus the end plate can thus be introduced into the filter element in a simple manner via the first and second form-fitting contours.

In a preferred embodiment, the transmission region has at least one transmission contour for transmitting a torque. The transmission contour is preferably designed to interact with a mating contour of the housing part. In other words, in the installed state, the transmission contour preferably forms a form fit with the mating contour of the housing part so that the torque can be transmitted from the end plate to the housing part. This advantageously enables a detachable connection between the end plate of the filter element and the housing part. As a result, the filter element can be replaced quickly and easily during maintenance.

The transmission region can have an axis of rotation that lies on the longitudinal axis of the filter element. The transmission region can be designed to at least partially extend circumferentially about the axis of rotation.

Specifically, the transmission contour can be designed to at least partially extend circumferentially about the axis of rotation. Preferably, the transmission region is formed to be completely closed in the circumferential direction. Preferably, the transmission contour is formed completely closed in the circumferential direction. It is possible that the transmission region is formed in sections in the circumferential direction. The transmission contour can be formed closed in certain sections in the circumferential direction.

Preferably, the transmission region forms a circumferential collar. Preferably, the transmission region is annular in shape. In other words, in the transmission region, the end plate can be sleeve-shaped by the collar. The circumferential collar can extend in the opposite direction of the form-fitting element. In other words, the collar and the form-fitting element extend in two opposite directions along the longitudinal axis of the filter element. The transmission contour is preferably formed radially on the outside on the circumferential collar. The collar extends in the circumferential direction around the filter material. Such a design of the transmission region enables a compact construction of the filter element in the region of the end faces.

In a preferred embodiment, the transmission contour of the transmission region and the first form-fitting contour of the form-fitting element form a common contour. In other words, the transmission region and the form-fitting element form a common component that has the common contour consisting of the transmission contour and the form-fitting contour. The transmission contour and the form-fitting contour preferably merge continuously. It is of advantage here that only a single component is required to receive and transmit the torque. As a result, the end plate has a simplified constructional design.

Particularly preferably, the transmission contour, in particular the common contour, has at least one surface which forms a form fit with the mating contour of the housing part in the installed state. The surface preferably extends in the longitudinal direction of the filter element. The surface can be formed to be parallel and/or inclined with respect to the axis of rotation of the end plate. The surface can form a contact surface for the mating contour of the housing part. When a torque is transmitted, the surface interacts with the mating contour of the housing part. Specifically, the mating contour of the housing part rests at least partially against the surface so that torque transmission takes place. The transmission contour can be manufactured in a simple manner, thereby saving costs.

The surface can be formed by a flattening. In other words, the transmission region can be flattened at its circumference such that the surface is formed.

More preferably, the transmission contour forms a multi-edge contour. Preferably, the multi-edge contour has a multiplicity of surfaces which are arranged in a row. The surfaces can have a planar configuration. Additionally or alternatively, the surfaces can be curved. For example, the multi-edge contour can be corrugated. Additionally or alternatively, the multi-edge contour can form a Torx profile. Additionally or alternatively, the multi-edge contour can be star-shaped. The surfaces are preferably arranged in a row at the circumference of the transmission region. The surfaces are preferably arranged in a row in the circumferential direction so that the transmission contour is formed in a closed manner. The transmission contour can be star-shaped or corrugated. The transmission contour as a multi-edge contour has the advantage that during torque transmission, the force application is distributed evenly over the circumference of the transmission region by the multiplicity of surfaces. As a result, loosening or tightening the housing part of the filter device during maintenance can be carried out in an improved manner.

In a preferred embodiment, the end plate has at least one receiving groove for the filter material, into which the filter material protrudes. The circumferential collar at least partially circumferentially delimits the receiving groove radially on the outside. In other words, a receiving groove is formed in the end plate, which faces the end face of the filter material. The filter material extends into the receiving groove. The circumferential collar, which also has the transmission contour, delimits the filter material radially on the outside. Alternatively, it is also possible for the filter material to be circumferentially delimited radially on the outside in the region of the end face by another collar. By means of the receiving groove, the filter material can be connected to the end plate in an improved manner. Furthermore, the receiving groove forms a form fit with the filter material so that a radial position, in particular the hollow-cylindrical shape, of the filter material is fixed. This facilitates the production of the filter element.

The end plate can have at least one guide extension which at least partially circumferentially delimits the receiving groove radially on the inside. The guide extension can be formed by an annular web which extends into the filter element. The guide extension supports the filter material radially on the inside. This improves an overall stability of the filter element, in particular during operation.

Furthermore, the end plate can have at least one sealing region formed radially on the outside for sealing against the housing part. The sealing region can be formed on an outer circumference of the end plate. The sealing region can be formed radially on the outside on the form-fitting element. Alternatively or additionally, the sealing region can be formed radially on the outside on the transmission region. Preferably, the sealing region has at least one groove for receiving a sealing means. The sealing means can be a sealing ring. Specifically, the sealing means can be formed by an O-ring. The groove is preferably formed circumferentially on the circumference of the end plate. Alternatively or additionally, the groove can be formed circumferentially on the form-fitting element. The sealing region serves to seal the end plate against the housing part so that an interior of the housing part is closed with respect to the outside in a fluid-tight manner.

In a preferred embodiment, the end plate is formed integrally. In other words, the end plate is preferably formed in one piece. In this case, the transmission region and the form-fitting element are preferably formed integrally with each other. The transmission region and the form-fitting element can be rigidly connected to each other. As a result, efficient torque transmission between the form-fitting element and the transmission region is made possible.

Particularly preferably, the end plate is formed from aluminum or plastics. In this case, the end plate is preferably formed by a die casting process or an injection molding process. In other words, the end plate can be formed as a die-cast part or as an injection-molded part. Alternatively, the end plate can be formed by an additive production method. As a result, the end plate can be produced in a cost-effective manner. Forming the end plate from other materials is possible.

In an embodiment, the invention relates to a filter device for the filtration of fluids, in particular hydraulic oil, having a first housing part, in particular a filter head, at least one second housing part, in particular a filter cover and/or filter pot, which is releasably connected to the first housing part in a fluid-tight manner, and at least one filter element. The filter element can be a filter element according to the invention. The filter element is coupled to the second housing part in a torque-transmitting manner, so that a rotational movement can be transmitted from the filter element to the second housing part for forming and/or for releasing the fluid-tight connection.

Preferably, the second housing part is connected to the first housing part in a fluid-tight manner by a rotary closure. Particularly preferably, the second housing part is screwed to the first housing part. In order to detach the second housing part from the first housing part or to connect the second housing part to the first housing part in a fluid-tight manner, a torque is introduced into the filter element and transmitted to the second housing part via the torque-locking connection between the filter element and the second housing part. The second housing part is thereby rotated along with the filter element so that the fluid-tight connection between the first housing part and the second housing part is formed or released.

The filter device according to the invention has the advantage that the two housing parts can be easily and quickly connected to or detached from each other by the filter element. This facilitates assembly or disassembly of the filter element with the second housing part. Furthermore, operation of the filter device is only possible with the filter element inserted since only the filter element connects the two housing parts with each other in a fluid-tight manner. This means that the filter device cannot be finally assembled and thus operated without the filter element. As a result, the operational reliability of the filter device and of a connected fluid system, in particular a hydraulic system, is increased.

Particularly preferably, the filter element has at least one end plate with at least one form-fitting element for rotationally moving the second housing part. The form-fitting element is preferably actuatable from the outside in order to transmit a torque to the second housing part. The form-fitting element serves to receive a torque from outside, that is, from outside the second housing part. The actuation of the form-fitting element and thus the introduction of a torque into the end plate is preferably performed by a tool. Here, the form-fitting element is accessible from outside the second housing part so that a rotational movement can be introduced. The form-fitting element can protrude outwards beyond the second housing part. This improves operation during maintenance of the filter device.

Actuation of the filter element is to be understood to mean that the filter element is rotated about its longitudinal axis by introducing a torque into the form-fitting element, and a torque is transmitted to the second housing part by the form-fitting connection between the end plate and the second housing part, so that the latter rotates along with the filter element.

In a preferred embodiment of the filter device according to the invention, the second housing part has at least one opening through which the form-fitting element of the filter element is accessible for actuation from the outside. The opening forms a free passage through the second housing part. The form-fitting element is freely accessible through the opening from outside the second housing part. The form-fitting element can be spaced apart from an inner side of the opening. This simplifies handling when transmitting torque to the form-fitting element in the region of the opening.

The opening of the form-fitting element is freely accessible from the outside so that an actuation of the filter element or a rotation of the filter element is made possible from the outside and the second housing part can thus be detached from or connected to the first housing part. Due to the opening, accessibility is thus be improved and assembly or disassembly is simplified.

The end plate preferably closes the opening in a fluid-tight manner. Preferably, the end plate forms a section of the second housing.

In another preferred embodiment, the form-fitting element of the filter element protrudes through the second housing part so that the form-fitting element is accessible for actuation from the outside. In other words, the form-fitting element preferably protrudes through the opening. The form-fitting element can protrude beyond the second housing part. It is advantageous here that the form-fitting element can be reached in a more improved way due to the protrusion, and handling is therefore simplified.

Alternatively, the form-fitting element may only protrude into the opening. It is also possible that the form-fitting element is only freely accessible from the outside through the opening, with the form-fitting element being located inside the second housing part. It is possible that the inside of the opening has the mating contour of the second housing part. In other words, the transmission region of the end plate can be in contact with the inside of the opening so that a form fit is formed for torque transmission.

In a preferred embodiment of the filter device according to the invention, the second housing part and the end plate of the filter element are form-fittingly connected to each other so that a torque can be transmitted from the filter element to the second housing part. In other words, the second housing part and the filter element form a joint form fit to transmit a rotational movement from the filter element to the second housing part. The filter element and the second housing part are in form-fitting contact with each other. By means of the form fit between the filter element and the second housing part, the second housing part can be quickly and easily detached from or connected to the first housing part.

In a further preferred embodiment of the filter device according to the invention, the second housing part has a mating contour and the end plate of the filter element has a transmission contour and/or the form-fitting element of the filter element has a form-fitting contour. The transmission contour and/or the form-fitting contour are/is preferably designed to be complementary to the mating contour for torque transmission. As a result, an improved force transmission from the end plate to the second housing part is made possible.

Preferably, the end plate has a transmission region with the transmission contour. The transmission contour serves to transmit a torque from the end plate to the second housing part. Additionally or alternatively, the end plate preferably comprises the form-fitting element with the form-fitting contour. The transmission contour and form-fitting contour can be formed separately from one another.

Alternatively, the transmission contour and the form-fitting contour can form a common contour for receiving and transmitting a torque.

The transmission contour and the mating contour are preferably designed to be complementary. Alternatively or additionally, the form-fitting contour of the form-fitting element can be designed to be complementary to the mating contour. Preferably, the common contour is designed to be complementary to the mating contour.

In another embodiment, the invention relates to an arrangement of a housing part, in particular a filter cover or a filter pot, a filter device and a filter element, wherein the filter element can be connected or is connected to the housing part in a form-fitting manner so that a torque can be transmitted from the filter element to the housing part. The filter element can be configured in the manner described above.

In yet another embodiment, the invention relates to a method for assembling a filter element, wherein a filter device for the filtration of fluids, in particular hydraulic oil, has a first housing part, in particular a filter head, at least one second housing part, in particular a filter cover and/or filter pot, and at least one filter element, in particular a filter element according to the invention, with an end plate. In the method according to the invention, the end plate of the filter element is coupled to the second housing part in a torque-transmitting manner, the second housing part is arranged on the first housing part and a torque is introduced into the end plate and the torque is transmitted from the end plate to the second housing part so that the second housing part is connected to the first housing part in a fluid-tight manner.

With regard to the advantages of the arrangement and the assembly method, reference is made to the advantages explained in connection with the filter element and the filter device. Furthermore, alternatively or additionally, the arrangement and the assembly method can comprise individual or a combination of several features previously mentioned with respect to the filter element and the filter device.

The invention is explained in more detail below with reference to the accompanying drawings. The embodiments illustrated represent examples of how the filter element according to the invention and the filter device according to the invention can be configured.

In the figures.

In the following, the same reference numerals are used for identical and identically acting parts.

Figure 1:
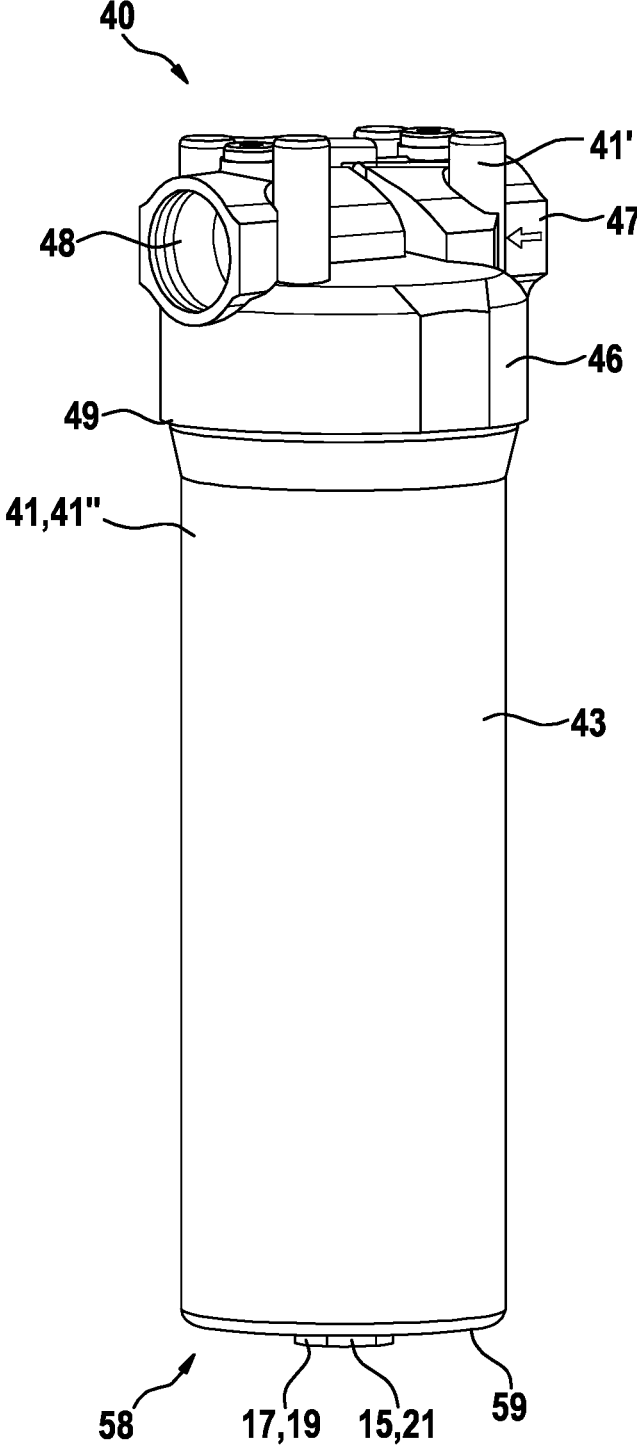
FIG. 1 shows a perspective view of a filter device according to a preferred exemplary embodiment of the invention.

FIG. 1 shows a filter device 40 according to a preferred exemplary embodiment according to the invention. Specifically, the filter device 40 is a pressure filter used in pressure systems. The filter device 40 is suitable for use in high-pressure systems, in particular up to an operating pressure of 100 bar. The filter device 40 is not limited to high-pressure use. For example, the filter device 40 can be used in low-pressure systems.

The filter device 40 is used for the filtration of fluids. Preferably, the filter device 40 is used for the filtration of hydraulic oil. The filter device 40 comprises two housing parts 41 and a filter device 10, which will be discussed in more detail later.

Specifically, the filter device 40 comprises a first housing part 41' and a second housing part 41". The first housing part 41' is formed by a filter head 46. The second housing part 41" is formed by a filter pot 43. The filter head 46 has a first port 47 for the inlet of a fluid to be filtered and a second port 48 for the outlet of the filtered fluid.

Figure 3:
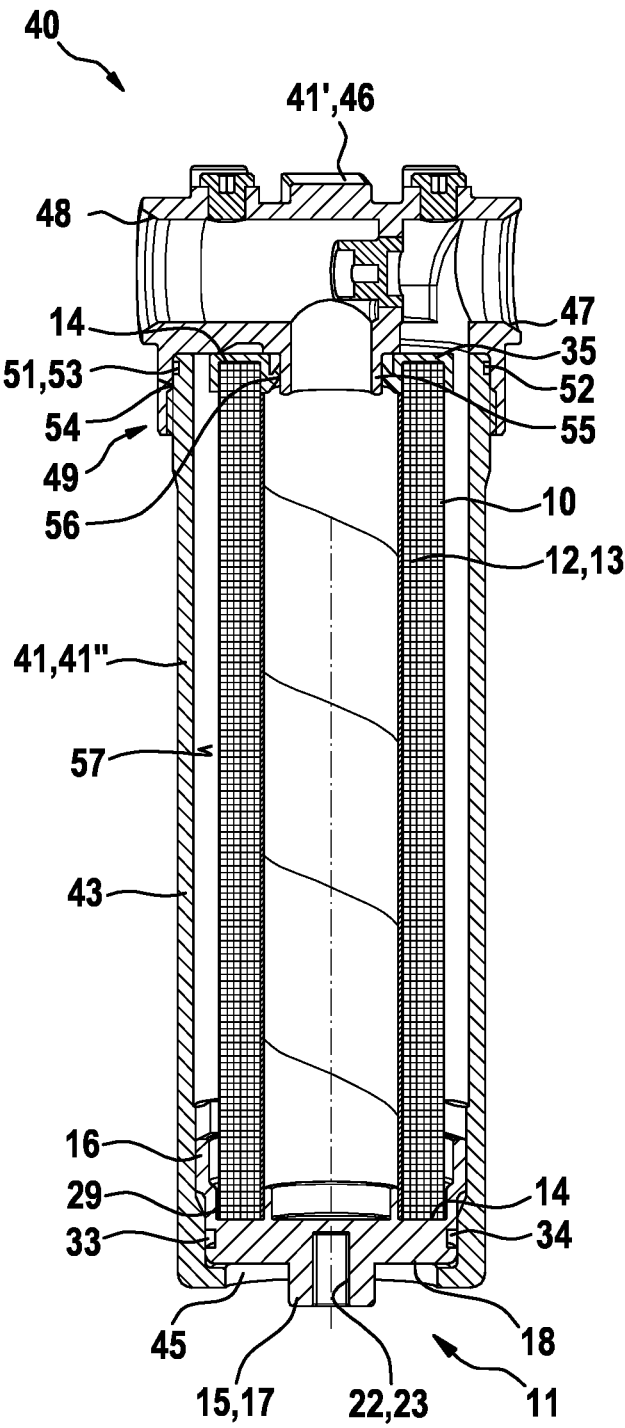
FIG. 3 shows a longitudinal section through the filter device according to FIG. 1.

The filter head 46 and the filter pot 43 are connected to each other in a fluid-tight manner. As can be clearly seen in both FIG. 3 and FIG. 6, the filter head 46 and the filter pot 43 are form-fittingly connected to each other. Specifically, the filter head 46 and the filter pot 43 are screwed together. For fluid-tight connection, the filter pot 43 has a sealing portion 51 at a first axial end 49 facing the filter head 46 (FIG. 3). A circumferential groove 52 is formed in the sealing portion 51, which accommodates a sealing means 53. The sealing means 53 is in abutting contact with an inner surface 54 of the filter head 46, so that the fluid-tight connection is formed. The sealing means 53 can be an O-ring.

Furthermore, the filter head 46 has a receiving socket 55 for receiving the filter element 10. The filter element 10 is fluidly connected to the second port 47 through the receiving socket 55. For this purpose, the filter element 10 is attached to the second port 47.

Figure 4:
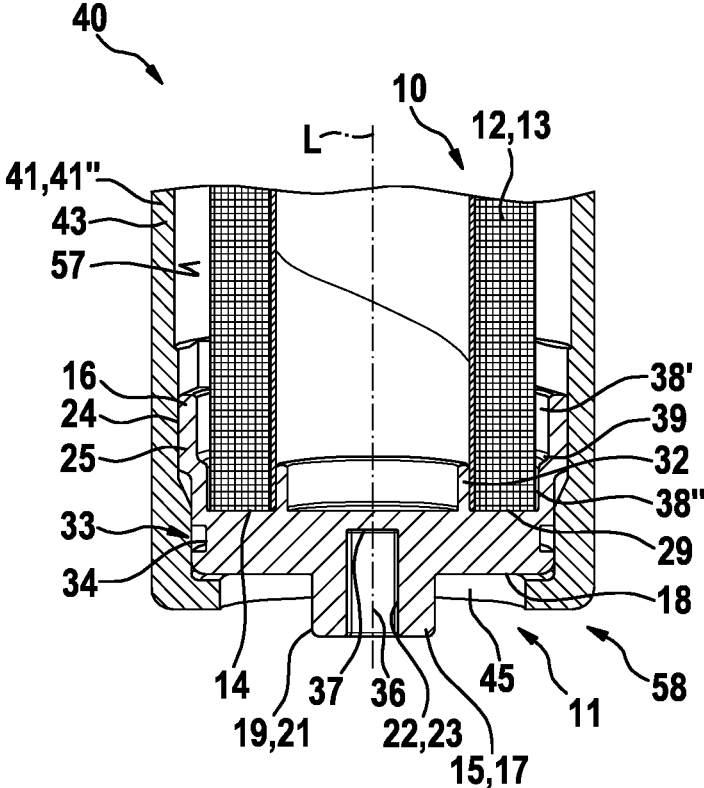
FIG. 4 shows a detailed view of a longitudinal section through the filter device according to FIG. 1 in the bottom region.

As shown in FIGS. 3 and 4, the filter device 40 comprises the filter element 10. The filter element 10 comprises a filter material 12 having a hollow-cylindrical shape 13. The filter element 10 has a longitudinal axis L along which the filter material 12 extends. The filter material 12 is pleated such that the filter material 12 has a multiplicity of pleats extending parallel to each other. The pleats form successive pleat peaks and pleat valleys connected in each case by a pleat flank. The fluid to be filtered can flow through filter material 12 which has at least one functional layer for removing foreign matter from the fluid.

Furthermore, the filter element 10 comprises two end plates 11, 35 which are arranged opposite one another in each case on an end face of the filter material. A first one of the two end plates 11, 35 is arranged on the end face 14 of the filter material 12 facing away from the filter head 46. A second one of the two end plates 11, 35 is arranged on the end face 14 of the filter material 12 facing the filter head 46. The two end plates 11, 35 each form an axial end of the filter element 10. This can be clearly seen in FIGS. 3 and 5.

The filter material 12 is connected at the end faces 14 in each case to one of the two end plates 11, 35 in a firm, in particular rotationally fixed manner.

The filter element 10 is form-fittingly connected to the filter pot 43 by the first end plate 11. The filter element 10 is arranged in the filter device 40 in a replaceable manner. The first end plate 11 of the filter element 10 is detachably connected to the filter pot 43. The first end plate 11 is configured to transmit a torque to the filter pot 43. As a result, the filter pot 43 can be connected to the filter head 46 in fluid-tight manner, or the filter pot 43 can be detached from the filter head 46. This is necessary, for example, during initial assembly of the filter pot 43 with the filter element 10 to the filter head 46 and during replacement of the filter element 10. Torque transmission will be discussed in more detail later.

The first end plate 11 of the filter element 10 has a form-fitting element 15 for receiving a torque and a transmission region 16 for transmitting the received torque to the filter pot 43. The form-fitting element 15 is designed in such a manner that the filter element 10 can be set in a rotational movement about its longitudinal axis L.

The form-fitting element 15 is formed at an end 18 of the end plate 11 remote from the end face 14 and protrudes from the first end plate 11 along the longitudinal axis L of the filter element 10. The form-fitting element 15 extends outwards with respect to the end face 14 of the filter material 12 along the longitudinal axis L, as is clearly visible in FIG. 4. The form-fitting element 15 is formed by an extension 17. The extension 17 is formed centrically, in particular in the middle, on the first end plate 11. The extension 17 has an axis of rotation that coincides with the longitudinal axis L of the filter element 10.

The extension 17 has a first form-fitting contour 19 which is formed radially on the outside. The first form-fitting contour 19 is configured to receive a torque from a tool, which is not shown, and to introduce it into the first end plate 11. In other words, the extension 17 is connectable to an external tool via the first form-fitting contour 19. The first form-fitting contour 19 is formed by an external hexagon 21 shown in FIGS. 2 and 5. The tool can be a wrench or pliers.

Figure 2:
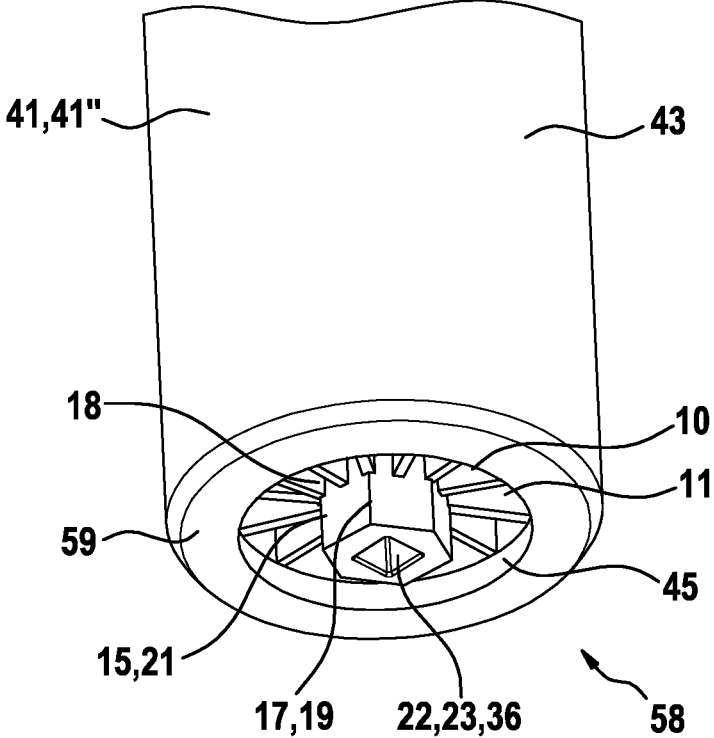
FIG. 2 shows a perspective bottom view of a bottom region of the filter device according to FIG. 1.

Furthermore, the extension 17 has a second form-fitting contour 22 which is formed radially on the inside. The second form-fitting contour 22 is configured to receive a torque from another tool, which is not shown, and to introduce it into the first end plate 11. In other words, the extension 17 is connectable to another external tool via the second form-fitting contour 22. The second form-fitting contour 19 is formed by an internal square 23, which is shown in FIG. 2. The second form-fitting contour 22 is formed by a recess 36 extending in the longitudinal direction into the first end plate 11. The recess 36 has a bottom 36 that closes the recess 36 in the longitudinal direction.

The first and second form-fitting contours 19, 22 have the longitudinal axis L of the filter element 10 as a common axis. Other configurations of the two form-fitting contours 19, 22 are possible.

As described above, the first end plate 11 has a transmission region 16 which, when actuated, transmits a torque introduced via the form-fitting element 15 to the filter pot 43. As shown in FIGS. 3 and 4, the transmission region 16 is formed by a circumferential collar 25 extending in the opposite direction of the form-fitting element 15. The circumferential collar 25 encloses the filter material 12 radially on the outside. The circumferential collar 25 is thin-walled. In other words, the circumferential collar 25 is formed in a sleeve-shaped manner. The circumferential collar 25 is spaced apart from the filter material 12 at least in one axial region. In other words, an annular gap is formed at least in one axial region between the circumferential collar 25 and the filter material 12. The axial region is adjacent to a free end of the transmission region 16.

The circumferential collar 25 has a step 39 that tapers the collar 25 radially inwards. In other words, the circumferential collar 25 has a first inner diameter 38' and a second inner diameter 38". The first inner diameter 38' is formed in the aforementioned axial region. The first inner diameter 38' is larger than the second inner diameter 38". The step 39 forms the transition between the first and second inner diameters 38', 38". The circumferential collar 25 is formed funnel-shaped in certain sections.

The transmission region 16 has a transmission contour 24. The transmission contour 24 serves to transmit the torque received by the form-fitting contour 19, 22 to the filter pot 43. The transmission contour 24 is designed to interact with the filter pot 43 in a torque-transmitting manner. For this purpose, the filter pot 43 has a mating contour 44. The transmission contour 24 of the first end plate 11 and the mating contour 44 of the filter pot 43 are designed to be complementary to one another. The transmission contour 24 of the first end plate 11 and the mating contour 44 correspond with each other so that upon actuation, a torque can be transmitted from the first end plate 11 to the filter pot 43. As can be seen in FIGS. 3 and 4, the transmission contour 24 and the mating contour 44 form a form fit. The mating contour 44 will be discussed in more detail later.

The transmission contour 24 is formed radially on the outside on the circumferential collar 25. In other words, the transmission contour 24 is formed on the circumference of the circumferential collar 25. The transmission contour 24 is formed by a multiplicity of surfaces 27. The surfaces 27 are arranged in a row so that the transmission contour 24 is circumferentially closed. In other words, the surfaces 27 are formed contiguously in the circumferential direction so that the transmission contour 24 is completely circumferentially closed. The surfaces 27 are formed by a multiplicity of flattenings. Specifically, the transmission contour 24 is formed as a multi-edge contour 28. The multi-edge contour 28 is formed circumferentially on the collar 25. Specifically, the multi-edge contour 28 is formed by the surfaces 27 arranged in a row in the circumferential direction.

The first end plate 11 further has a receiving groove 29 for the filter material 12, which is delimited radially on the outside by the circumferential collar 25. Specifically, the receiving groove 29 is delimited on the outside by the axial region in which the circumferential collar 25 has the second inner diameter 38". The circumferential collar 25 thus forms a wall extending radially and circumferentially around the filter material 12. Furthermore, the receiving groove 29 is delimited radially on the inside by a guide extension 32. The guide extension 32 extends into the interior of the filter element 10. The guide extension 32 is formed annularly. The guide extension 32 forms a wall extending radially and circumferentially on the inside of the filter material 12. As can be seen in FIGS. 3 and 4, the filter material 12 protrudes in the longitudinal direction into the receiving groove 29. The filter material 12 is preferably connected to the first end plate 11 in the receiving groove 29 in a firmly bonding manner, in particular by adhesive bonding.

According to FIGS. 3 and 4, the first end plate 11 has a sealing region 33 comprising a sealing means, which is not shown, for sealing against the filter pot 43. The sealing area 33 is arranged radially on the outside on the first end plate 11 such that there is a fluid-tight connection between the first end plate 11 and the filter pot 43. The sealing region 33 has a groove 34 for receiving the sealing means. The sealing means can be an O-ring. The groove 34 is formed circumferentially in the sealing region 33.

The sealing region 33 adjoins the circumferential collar 25 of the transmission region 16 in the longitudinal direction. The sealing area 33 has a circumferential surface that rests against a mating surface, in particular inner surface, of the filter pot 43.

The first end plate 11 is formed integrally with the form-fitting element 15 and the transmission region 16. In other words, the form-fitting element 15 and the transmission region 16 are formed in one piece.

The filter pot 43, which is the second housing part 41" of the filter device 40, receives the filter element 10. In other words, the filter element 10 is arranged in the filter pot 43. An annular gap for the fluid to be filtered is formed between the filter pot 43 and the filter material 12 of the filter element 10. In other words, the filter pot 43 has an inner surface 57 from which the filter material 12 of the filter element 10 is spaced apart.

Figure 6:
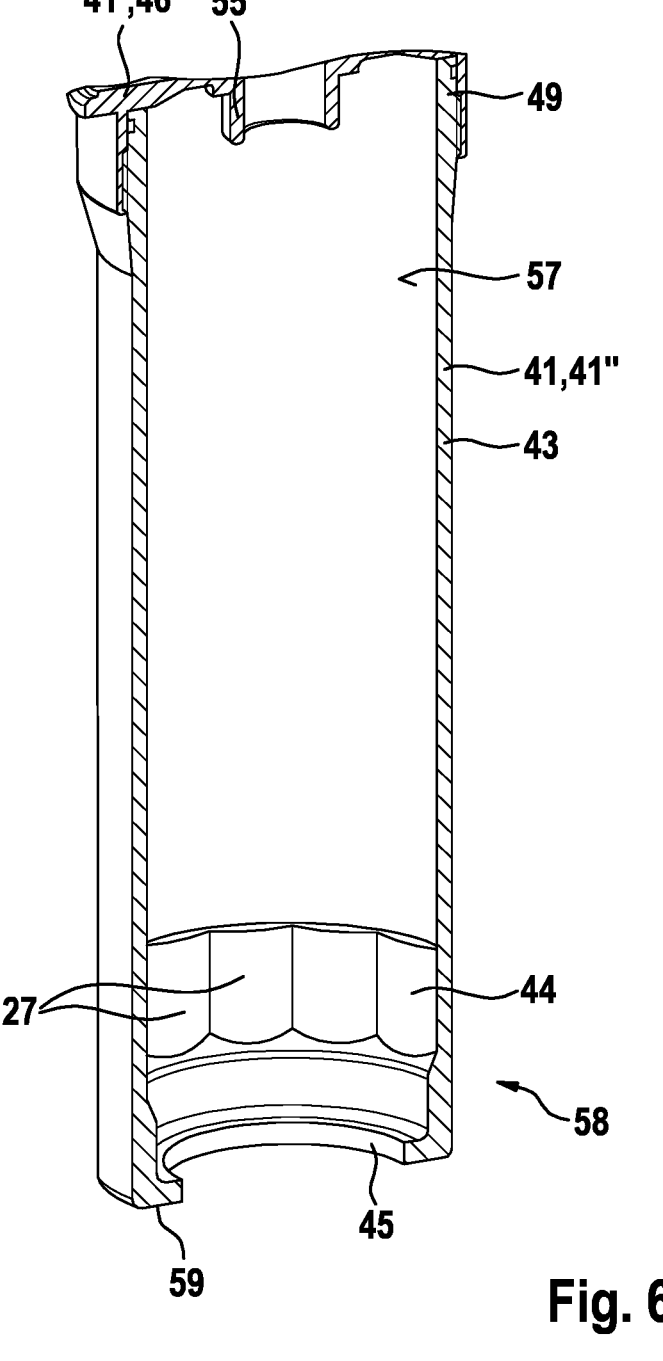
FIG. 6 shows a longitudinal section through the filter device according to FIG. 1, with the filter element hidden.

As described above, the filter pot 43 has a mating contour 44 that is formed to be complementary to the transmission contour 24. FIG. 6 clearly shows that the mating contour 44 is formed on the inner circumference of the filter pot 43. Here, the mating contour 44 is part of the filter pot 43. In other words, the mating contour 44 is formed integrally with the filter pot 43. The mating contour 44 extends circumferentially around the inner circumference of the filter pot 43. The mating contour 44 is formed by a multiplicity of surfaces 27 arranged in a row.

The filter pot 43 has a bottom region 58 formed at a free end 59 of the filter pot 43. The free end 59 faces away from the filter head 46. The mating contour 44 is formed in the bottom region 58. The mating contour 44 of the filter pot 43 is radially directly opposite the transmission contour 24 of the first end plate 11. The mating contour 44 of the filter pot 43 and the transmission contour 24 of the transmission region 24 are arranged to rest against each other.

The mating contour 44 and the transmission contour 24 engage with each other so that torque transmission from the first end plate 11 to the filter pot 43 can take place. The mating contour 44 and the transmission contour 24 form a form fit. Specifically, the form fit is formed between the mating contour 44 and the transmission contour 24 in the circumferential direction. In other words, the filter element 10 is form-fittingly connected to the filter pot 43 by the transmission contour 24 of the first end plate 11 and the mating contour 44.

The filter pot 43 and the filter element 10 are connected to each other in a rotationally fixed manner, so that a torque can be transmitted from the filter element 10 to the filter pot 43. The filter element 10 is connected to the filter pot 43 in a displaceable manner. Alternatively, the filter element 10 can be connected to the filter pot 43 in a non-displaceable manner.

The filter pot 43 has an opening 45 that forms a free passage to the filter element 10. The opening 45 is formed in the bottom region 58 in the longitudinal direction of the filter pot 43. The opening 45 is formed as a through opening. The opening 45 is formed cylindrically. In other words, the opening 45 is circular in cross-section. Alternatively or additionally, the opening 45 can be angular in shape.

According to FIGS. 2 to 4, the first end plate 11 of the filter element 10 is arranged in such a manner that the form-fitting element 15 is accessible from the outside through the opening 45. The extension 17 protrudes through the opening 45. In other words, the extension 17 extends through the opening 45. The opening 45 is formed such that a clearance is formed between the first form-fitting contour 19 and the filter pot 43. The extension 17 protrudes outwards beyond the filter pot 45.

The form-fitting element 15, in particular the extension 17, is accessible from outside the filter pot 43 through the opening 45. In other words, the form-fitting element 15 can be actuated through the opening 45 of the filter pot 43.

The first end plate 11 covers the opening 45 of the filter pot 43 so that the opening 45 is closed in a fluid-tight manner. The first end plate 11 forms part of the bottom, in particular the free end, of the filter pot 43.

Figure 5:
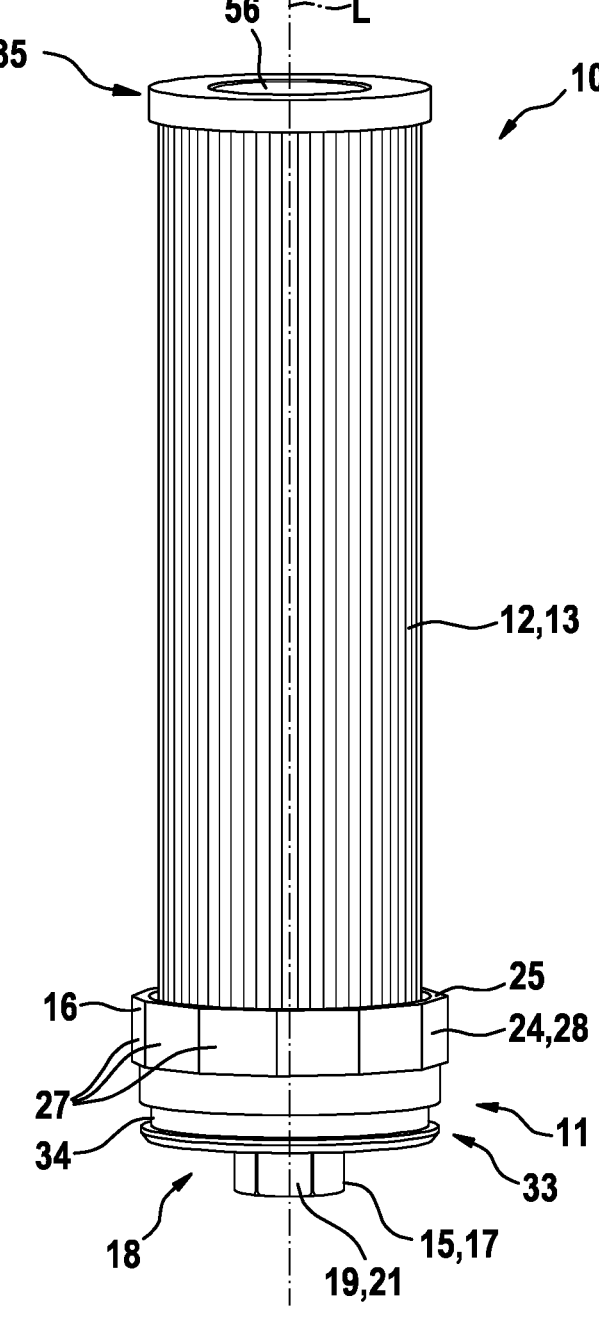
FIG. 5 shows a perspective view of a filter element according to a preferred exemplary embodiment according to the invention.

As shown in FIGS. 3 and 5, the filter element 10 is fluidly connected to the filter head 46 through the second end plate 35. Specifically, the filter element 10 is form-fittingly connected to the receiving socket 55 through the second end plate 35. The filter element 10 is detachably connected to the filter head 46, in particular to the receiving socket 55. The second end plate 35 is detachably held on the receiving socket 55.

The second end plate 35 has a circular ring shape. The second end plate 35 has an inner passage opening 56, which fluidly connects an interior of the filter element 10 to the second port 48. As shown in FIG. 3, the receiving socket 55 engages with the inner passage opening 56 of the second end plate 35. The second end plate 35 can be in contact with the receiving socket 55 in a fluid-tight manner.

Like the first end plate 11, the second end plate 35 also has a receiving groove for the filter material 12. In contrast to the receiving groove 29 of the first end plate 11, the receiving groove of the second end plate 35 is delimited radially on the outside only by a circumferential web, which has no transmission region for torque transmission. The inner delimitation of the receiving groove of the second end plate 35 is designed substantially like that of the receiving groove 29 of the first end plate. This one additionally has a latching element which is latched to the receiving groove 55 for holding the filter element 10.

The end plates 11, 35 can each be formed of metal and/or plastics. Preferably, the end plates 11, 35 are formed as a die-cast part or an injection-molded part.

In the following, the torque transmission during a replacement of the filter element 10 is described. First, a torque is introduced from outside the filter pot 43 into the first end plate 11 of the filter element 10 via the form-fitting element 15. A tool can be used for this purpose. Due to the form-fitting connection of the transmission contour 24 of the first end plate 11 with the mating contour 44 of the filter pot 43, the introduced torque is transmitted from the first end plate 11 to the filter pot 43. As a result, the filter pot 43 rotates along with the first end plate 11 and thus the filter element 10, so that the fluid-tight connection between the filter head 46 and the filter pot 43 is released. Specifically, the transmission of torque unscrews the screw connection between the filter head 46 and the filter pot 43 so that the filter pot 43 can be removed from the filter head 46. In the unscrewed state of the filter pot 43, the filter element 10 can be removed from the filter pot 43 and a replacement filter element can then be inserted. Assembly of the filter pot 43 with the replacement filter element inserted is performed in reverse order to the disassembly described above.

Figure 7:
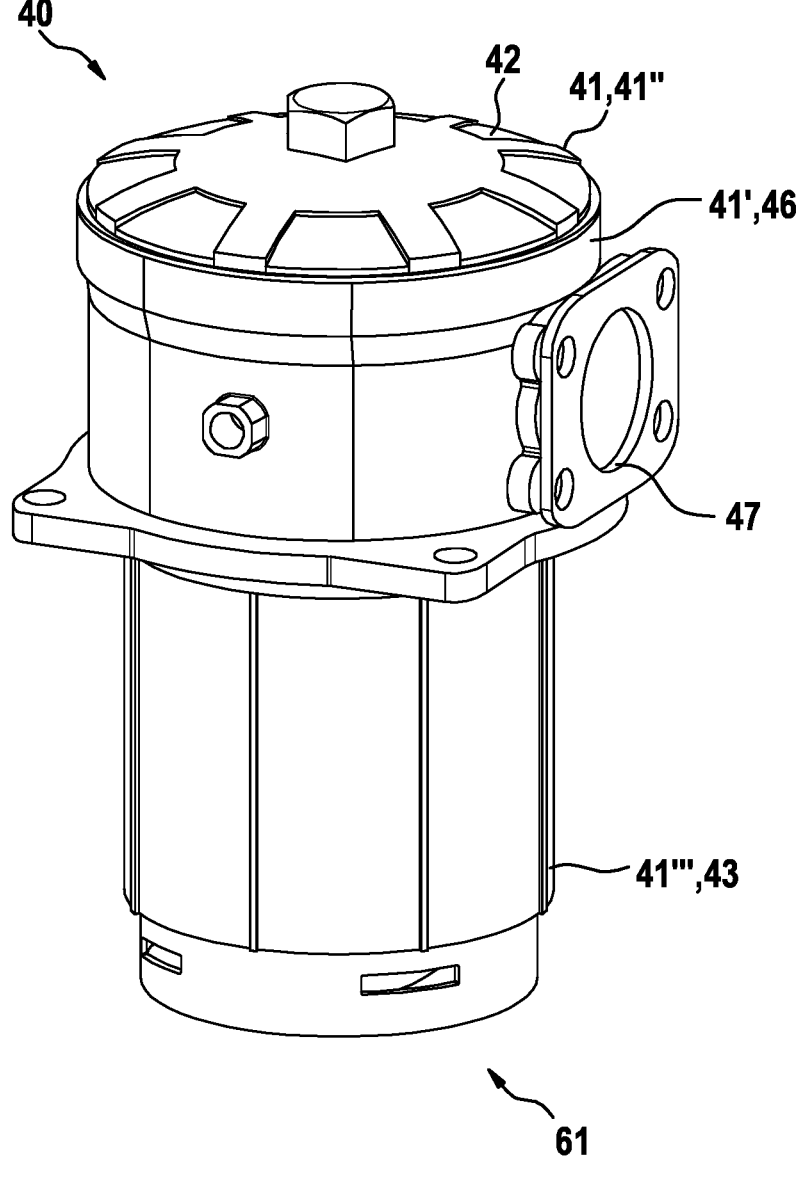
FIG. 7 shows a perspective view of a filter device according to another preferred exemplary embodiment.

FIG. 7 shows a filter device 40 according to another preferred exemplary embodiment according to the invention. Specifically, the filter device 40 is a return filter. However, the filter device according to FIG. 7 is not limited to the use as a return filter. It is possible that the filter device 40 is alternatively used as a suction filter, return suction filter or the like. Other alternative applications are possible.

The filter device 40 is used for the filtration of fluids. Preferably, the filter device 40 is used for the filtration of hydraulic oil. The filter device 40 comprises three housing parts 41 and a filter element 10, which will be discussed in more detail later.

Specifically, the filter device 40 has a first housing part 41', a second housing part 41" and a third housing part 41'". The first housing part 41' is formed by a filter head 46. The second housing part 41" is formed by a filter cover 42. The third housing part 41'" is formed by a filter pot 43. The filter head 46 has a port 47 for the inlet of a fluid to be filtered and an outlet region 61 for the outlet of the filtered fluid.

The filter head 46 and the filter cover 42 are connected to each other in a fluid-tight manner. As can be clearly seen in FIGS. 8 and 10, the filter head 46 and the filter cover 42 are force-fittingly connected to each other. Specifically, the filter cover 42 is screwed into the filter head 46 in a fluid-tight manner. The filter pot 43 shown in FIG. 7 is form-fittingly mounted in the filter head 46.

Figure 8:
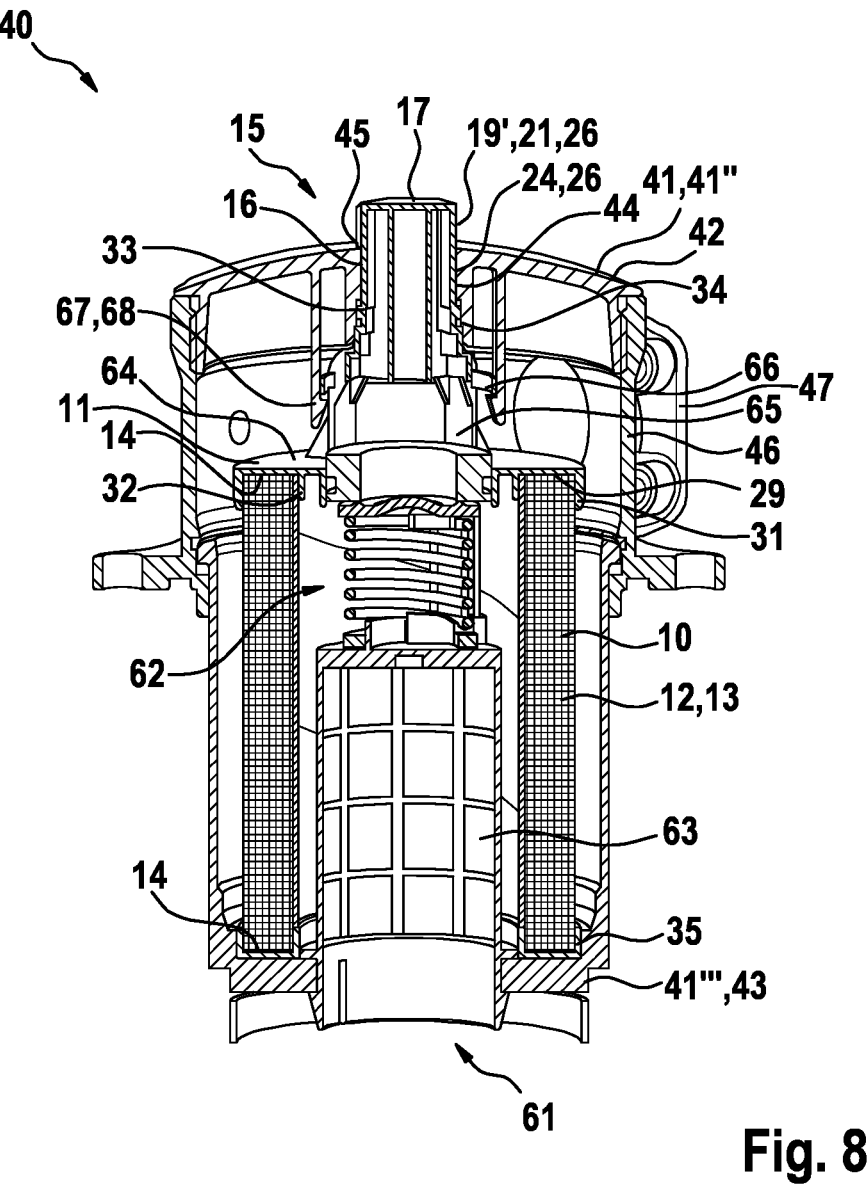
FIG. 8 shows a longitudinal section through the filter device according to FIG. 7.

As shown in FIG. 8, the filter device 40 has the filter element 10. The filter element 10 is inserted into the filter pot 43 through the filter head 46, wherein the filter element 10 is arranged in sections in the filter pot 43 and filter head 46. Furthermore, a portion of the filter element 10 extends through the filter cover 42 so that a torque can be introduced into the filter element 10 from outside the filter device 40.

The filter element 10 has a filter material 12, which is configured according to the filter material 12 as described above according to FIGS. 3 and 4. The filter element 10 additionally has two end plates 11, 35 which are arranged opposite one another in each case on an end face 14 of the filter material 12. A first of the two end plates 11, 35 is arranged on the end face 14 of the filter material 12 facing the filter head 46. A second one of the two end plates 11, 35 is arranged on the end face 14 of the filter material 12 facing away from the filter head 46. The two end plates 11, 35 each form an axial end of the filter element 10. This can clearly be seen in FIG. 9. The filter material 12 is firmly connected at the end faces 14 to one of the two end plates 11, 35 in each case.

The filter element 10 is form-fittingly connected to the filter cover 42 via the first end plate 11. The filter element 10 is arranged in the filter device 40 in a replaceable manner. The first end plate 11 of the filter element 10 is therefore detachably connected to the filter cover 42. The first end plate 11 is designed to transmit a torque to the filter cover 42. As a result, the filter cover 42 can be connected to the filter head 46 in a fluid-tight manner or the filter cover 42 can be detached from the filter head 46. This is necessary, for example, during initial assembly of the filter cover 42 with the filter element 10 to the filter head 46 and during replacement of the filter element 10. Torque transmission will be discussed in more detail later.

The first end plate 11 of the filter element 10 has a form-fitting element 15 for receiving a torque and a transmission region 16 for transmitting the received torque to the filter pot 43. In the case of the filter element 10 of the filter device 40 shown in FIG. 7, the form-fitting element 15 and the transmission region 16 form a common extension 17. In other words, the form-fitting element 15 and the transmission region 16 form a common component. In this case, the form-fitting element 15 is directly adjacent to the transmission region 16. The first end plate 11 is integrally formed with the extension 17. In other words, the first end plate 11 is formed in one piece.

The extension 17 is arranged spaced apart in the longitudinal direction from a receiving region 64 for the filter material 12 of the first end plate 11. The extension 17 is rigidly connected to the receiving region 64 by means of webs 65. The receiving region 64 will be discussed in more detail later.

The extension 17 is formed to protrude along the longitudinal axis L of the filter element 10. With respect to the end face 14 of the filter material 12, the extension 17 extends along the longitudinal axis L, as can be clearly seen in FIG. 8. The extension 17 is formed centrically, in particular radially in the middle. The extension 17 has an axis of rotation which coincides with the longitudinal axis L of the filter element 10. The extension 17 is designed such that the filter element 10 can be set into a rotational movement about its longitudinal axis L.

The extension 17 has a form-fitting contour 19' which is formed radially on the outside. The form-fitting contour 19' is designed to receive a torque from a tool, which is not shown, and to transmit it to the filter cover 42. In other words, the extension 17 is connectable to an external tool via the form-fitting contour 19'. The form-fitting contour 19' is formed by an external hexagon 21, which is clearly visible in FIGS. 7 and 9. The tool can be a wrench or a pair of pliers. Other configurations of the form-fitting contour 19' are possible.

The extension 17 has a transmission contour 24 which is part of the form-fitting contour 19'. The transmission contour 24 and the form-fitting contour 19' form a common contour 26. The transmission contour 24 forms that region of the form-fitting contour 19' in which the received torque is introduced into the filter cover 42. As can be clearly seen in FIGS. 8 and 9, the transmission contour 24 corresponds to the form-fitting contour 19' in terms of its configuration. The transmission contour 24 is designed to interact with the filter pot 43 in a torque-transmitting manner. For this purpose, the filter cover 42 comprises a mating contour 44. The transmission contour 24 of the extension 17 and the mating contour 44 of the filter cover 42 are formed to be complementary to one another. The transmission contour 24 of the filter cover 42 and the mating contour 44 correspond to one other so that upon actuation, a torque can be transmitted from the extension 17 to the filter cover 42. As can be seen in FIGS. 7 and 8, the transmission contour 24 and the mating contour 44 form a form fit. The mating contour 44 will be discussed in more detail later.

The first end plate 11 further has a receiving groove 29 for the filter material 12, which is delimited radially on the outside by a circumferential collar 31. The receiving groove 29 is formed in the receiving region 64 of the first end plate 11. The receiving area 64 is formed to be disc-shaped.

The circumferential collar 31 forms a circumferential wall radially extending around the filter material 12. Furthermore, the receiving groove 29 is delimited radially on the inside by a guide extension 32. The guide extension 32 extends into the interior of the filter element 10. The circumferential collar 31 and the guide extension 32 are formed annularly. The guide extension 32 forms a circumferential wall extending radially on the inside around the filter material 12. As can be seen in FIG. 8, the filter material 12 protrudes into the receiving groove 29 in the longitudinal direction. The filter material 12 is preferably firmly bonded in the receiving groove 29 to the first end plate 11, in particular by adhesive bonding. This also applies to the second end plate 35 arranged opposite.

According to FIGS. 3 and 4, the first end plate 11 has a sealing region 33 that comprises a sealing means, not shown, for sealing against the filter cover 42. The sealing region 33 is arranged radially on the outside on the extension 17 such that there is a fluid-tight connection between the first end plate 11 and the filter cover 42. The sealing region 33 has a groove 34 for receiving the sealing means. The sealing means can be an O-ring. The groove 34 is formed circumferentially in the sealing region 33.

The sealing region 33 adjoins the form-fitting contour 19', specifically the transmission contour 24 of the extension 17, in the longitudinal direction. The sealing region 33 has a circumferential surface that rests against a mating surface, in particular an inner surface, of the filter cover 42.

As shown in FIG. 8, the filter pot 43 receives a portion of the filter element 10. An annular gap for the fluid to be filtered is formed between the filter pot 43 and the filter material 12 of the filter element 10.

Figure 10:
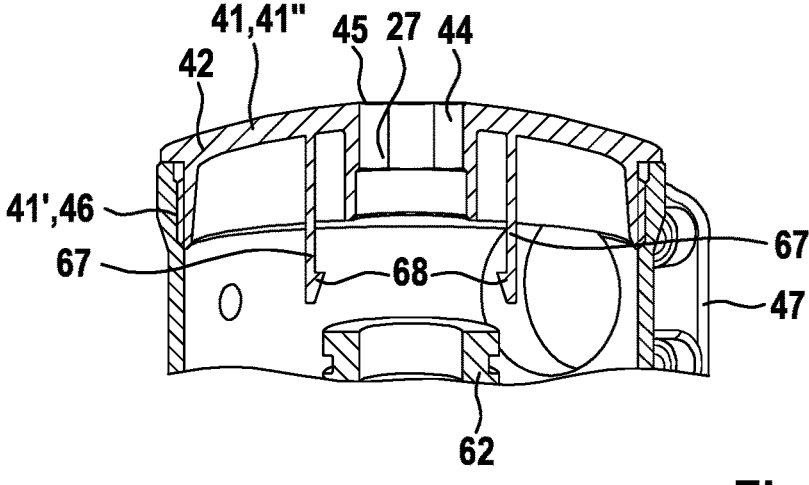
FIG. 10 shows a detailed view of a longitudinal section through the filter device according to FIG. 7 in the head region, with the filter element hidden.

In FIG. 10, it can be clearly seen that the filter cover 42 has an opening 45. The inner contour of the opening 45 is the mating contour 44. The opening 45 forms a free passage through the filter cover 42. The opening 45 is angular in cross-section. As described above, the mating contour 44 is formed to be complementary to the form-fitting contour 19' or the transmission contour 24.

The mating contour 44 is part of the filter cover 42. In other words, the mating contour 44 is integrally formed with the filter cover 42. The mating contour 44 extends circumferentially around the inner circumference of the filter pot 43. The mating contour 44 is formed by a plurality of surfaces 27 arranged in a row. The mating contour 44 of the filter cover 42 is directly radially opposite the transfer contour 24. The mating contour 44 of the filter pot 43 and the transmission contour 24 of the transmission region 24 are arranged to rest against one another.

The mating contour 44 and the transmission contour 24 engage with each other so that torque transmission from the extension 17 of the first end plate 11 to the filter cover can take place. The mating contour 44 and the transmission contour 24 form a form fit. In other words, the filter element 10 is form-fittingly connected to the filter cover 42 by the transmission contour 24 of the first end plate 11 and the mating contour 44.

The filter cover 42 and the filter element 10 are connected to each other in a rotationally fixed manner so that a torque can be transmitted from the filter element 10 to the filter cover 42. The filter element 10 is connected to the filter cover 42 in a displaceable manner. As a result, the filter cover 42 can be separated from the filter element 10 during disassembly.

Figure 9:
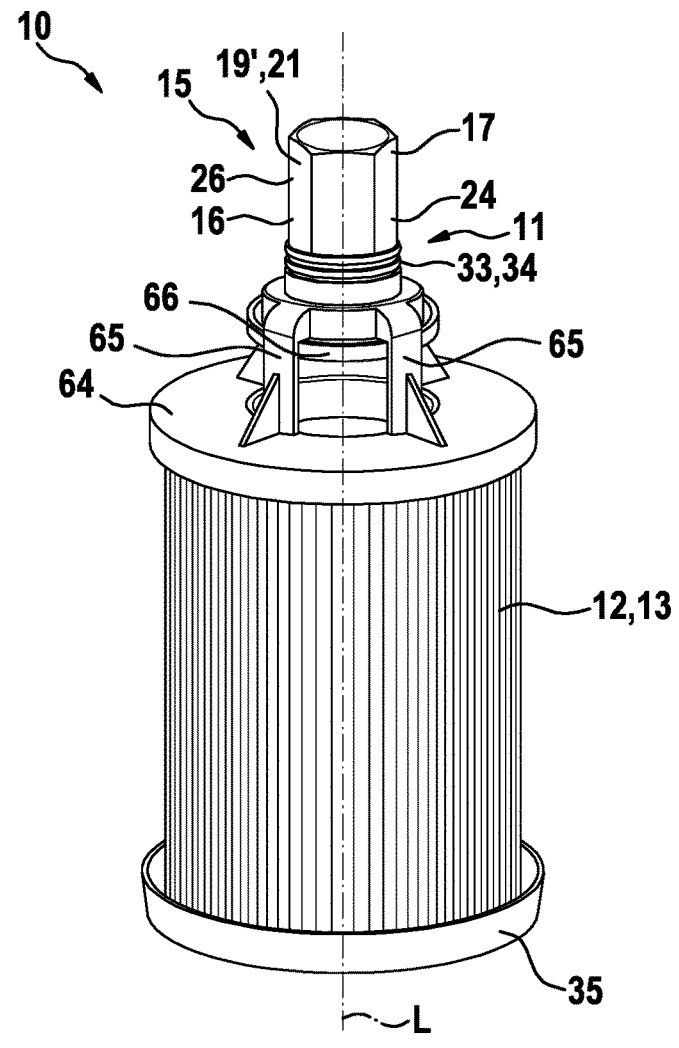
FIG. 9 shows a perspective view of a filter element according to another preferred exemplary embodiment.

According to FIGS. 8 and 9, the first end plate 11 of the filter element 10 is arranged such that the extension 17 protrudes through the opening 45 to the outside. In other words, the extension 17 extends outwards through the opening 45. The extension 17 protrudes outwards beyond the filter pot 45. The extension 17 is accessible or operable from outside the filter cover 42. The first end plate 11 closes the opening 45 of the filter cover 42 with the extension 17 in a fluid-tight manner. The first end plate 11 forms part of the filter cover 42.

The second end plate 35 corresponds substantially to the second end plate 35 of the filter element 10 of the filter device 40 according to FIG. 1. In contrast, the second end plate 35 of the filter element 10 according to FIGS. 8 and 9 does not have a latching element for fastening to a receiving socket.

The end plates 11, 35 can each be formed from metal and/or plastics. Preferably, the end plates 11, 35 are formed as a die-cast part or an injection-molded part.

As described above, the first end plate 11 has a plurality of webs 65. The first end plate 11 further has a holding ring 66 extending between the webs 65. The holding ring 66 extends circumferentially about the longitudinal axis L of the filter element 10. The holding ring 66 connects the webs 66 to one another. The holding ring 66 is arranged between the receiving region 64 and the extension 17.

As shown in FIG. 10, the filter cover 42 has at least one holding element 67. Preferably, multiple holding elements 67 are formed on the filter cover 42. The holding element 67 extends in the longitudinal direction into the filter cover 42. The holding element 67 is formed to be elastically deformable. In other words, the holding element 67 is formed to be flexible. The holding element 67 is formed to be resilient. The holding element 67 has a nose 68 for holding the filter element 10. The holding element 67 engages the holding ring 66 of the first end plate 11 by means of the nose 68. As a result, the filter element 10 is detachably held on the filter cover 42. Through this, assembly or disassembly is facilitated and the position of the filter element 10 is stabilized during operation.

A bypass unit 62 and a screening device 63 are arranged inside the filter element 10. The bypass unit 62 is partially arranged in the first end plate 11. The bypass unit 62 makes it possible to bypass the filter element 10 when a predetermined operating pressure on the inlet side of the filter element 10 is exceeded. This can occur, for example, when the filter element 10 becomes clogged. The screening device 63 is arranged downstream of the filter element 10 in the direction of flow. In other words, during operation, the fluid, in particular hydraulic oil, flows through the filter element 10 and subsequently through the screening device 63 to the outside via the outlet region 61.

In the following, the torque transmission during replacement of the filter element 10 is described. First, a torque is introduced from outside the filter cover 42 into the first end plate 11 of the filter element 10 via the extension 17. A tool can be used for this purpose. Due to the form-fitting connection of the transmission contour 24 of the first end plate 11 with the mating contour 44 of the filter cover 42, the introduced torque is transmitted from the extension 17 to the filter cover 42. As a result, the filter cover 42 rotates along with the first end plate 11 and thus the filter element 10 so that the fluid-tight connection between the filter head 46 and the filter cover 42 is released. Specifically, the transmission of the torque unscrews the screw connection between the filter head 46 and the filter cover 42 so that the filter cover 42 can be removed from the filter head 46. In the detached state the filter cover 42, the filter element 10 can be removed from the filter pot 43 and subsequently a replacement filter element can be inserted. The assembly of the filter cover 42 with the inserted replacement filter element is carried out in reverse order to the disassembly described above.

REFERENCE LIST 10 filter element
11 end plate, first end plate
12 filter material
13 hollow-cylindrical shape
14 end face of filter material
form-fitting element
16 transmission region
17 extension
18 end of the end plate facing away from the end face
19 first form-fitting contour
19' form-fitting contour
21 outer hexagon
22 second form-fitting contour
23 internal square
24 transmission contour
circumferential collar
26 common contour
27 surface
28 polygon contour
29 receiving groove
31 collar
32 guide projection
33 sealing region
34 groove
35 second end plate
36 recess
37 bottom
38' first inner diameter
38" second inner diameter
39 step
filter device
41 housing part
41' first housing part
41" second housing part
41'" third housing part
42 filter cover
43 filter pot
44 mating contour
45 opening
46 filter head
47 first port
48 second port
49 first axial end of filter pot
51 sealing portion
52 circumferential groove
53 sealing means 54 inner surface of filter head
55 receiving socket
56 inner passage opening
57 inner surface
58 bottom region
59 free end
61 outlet region
62 bypass unit
63 screening device
64 receiving region
65 webs
66 holding ring
67 holding element
68 nose
L longitudinal axis
The invention claimed is:

1. A filter device for the filtration of fluids having a first housing part, at least one second housing part, which is releasably connected to the first housing part in a fluid-tight manner, and at least one filter element having at least one end plate and a filter material which has a hollow-cylindrical shape and is connected to the end plate at an end face,
wherein the end plate is designed to transmit a torque to the second housing part of the filter device,
wherein the end plate has at least one form-fitting element for receiving a torque and at least one transmission region for transmitting the torque to the second housing part, wherein the filter element is coupled to the second housing part in a torque-transmitting manner so that a rotational movement can be transmitted from the filter element to the second housing part in order to form and/or to release the fluid-tight connection, wherein the second housing part has a mating contour and the end plate of the filter element has a transmission contour and/or the form-fitting element of the filter element has a form-fitting contour, wherein the transmission contour and/or the form-fitting contour is/are designed to be complementary to the mating contour for torque transmission, and the transmission contour forms a multi-edge contour which has a multiplicity of surfaces which are arranged in a row on a circumference of the transmission region.

2. The filter device according to claim 1, wherein the filter element has the at least one end plate with the at least one form-fitting element for rotationally moving the second housing part, wherein the form-fitting element is actuatable from the outside in order to transmit a torque to the second housing part.

3. The filter device according to claim 2, wherein the second housing part has at least one opening through which the form-fitting element of the filter element is accessible for actuation from the outside.

4. The filter device according to claim 2, wherein the form-fitting element of the filter element protrudes through the second housing part, so that the form-fitting element is accessible for actuation from the outside.

5. The filter device according to claim 1, wherein the second housing part and the end plate of the filter element are form-fittingly connected to one another, so that a torque can be transmitted from the filter element to the second housing part.

6. An arrangement of the filter device and the at least one filter element according to claim 1, wherein the filter element can be connected or is connected to the housing part in a form-fitting manner, so that a torque can be transmitted from the filter element to the housing part.

7. A method for assembling a filter element in the filter device according to claim 1, in which method the end plate of the filter element is coupled to the second housing part in the torque-transmitting manner;

the second housing part is arranged on the first housing part;

a torque is introduced into the end plate and transmitted from the end plate to the second housing part so that the second housing part is connected to the first housing part in a fluid-tight manner.

8. The filter device according to claim 1, wherein the transmission region forms a circumferential collar which extends in the opposite direction of the form-fitting element, wherein the transmission contour is formed radially on the outside on the collar.

\* \* \* \* \*